Patented June 1, 1937

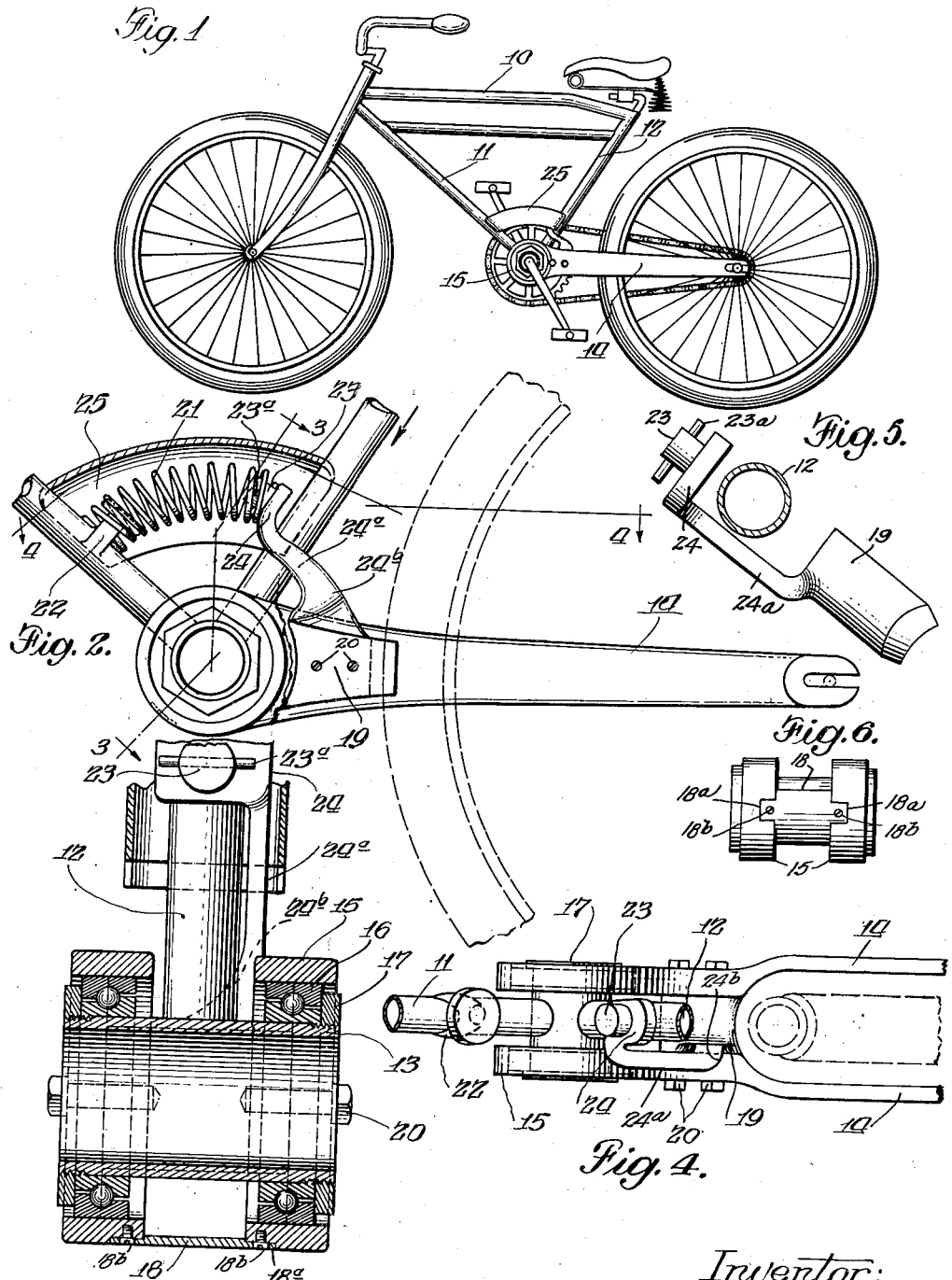

2,082,147

UNITED STATES PATENT OFFICE 2,082,147

BICYCLE

Don W. Bryant, Chicago, Ill., assignor of one-fourth to David B. Shapiro, and one-fourth to Bernard H. Sachar, Chicago, Ill.

Application August 28, 1935, Serial No. 38,286

9 Claims. (Cl. 208—97)

My invention relates to bicycles, and more particularly to cushioning means for the frames thereof, and my main object is to provide a means of this kind which is both compact and efficient.

A further object of the invention is to apply the novel means without any radical change in the conventional design of the bicycle frame.

Another object of the invention is to so construct the novel cushioning means as to be properly balanced, whereby to relieve the frame of undue strains.

An additional object of the invention is to so design the improvement that it will not create an unreasonable extra cost in the manufacture of the bicycle.

An important object of the invention is to build the novel cushioning means along such simple lines as to be inconspicuous.

Various cushioning structures for bicycles have been devised and patented in the past, although none seems to be manufactured or in use anywhere. Such forms as have come to my attention suggest impracticability from standpoints of the location, position and nature of the cushioning means. It will not suffice to simply provide a cushioning means, but such means must have the attributes of efficiency, durability, simplicity and economy in order to meet the requirements of the day. It is with these considerations in mind that I have made a distinct departure from the ideas of the past, and evolved a mechanism which fulfills the foregoing objects satisfactorily.

With the above objects in view, and any others which may suggest themselves from the description to follow, a better understanding of the invention may be had by reference to the accompanying drawing in which,—

Figure 1 is an elevation of a bicycle improved with the novel cushioning means;

Figure 2 is an enlarged view of the cushioning means, partly in section;

Figures 3 and 4 are, respectively, sections on the lines 3—3 and 4—4 of Figure 2 and Figure 5 is an elevation of a detail of the invention looking in the direction of the arrow, Figure 2.

Figure 6 is a reduced bottom plan of the hub.

In the application of the invention, specific reference to the drawing indicates a typical bicycle frame at 10, the same including the diagonal tubing posts 11 and 12 which unite at the bottom to form the sprocket hub 13. To make allowance for a cushioning device, it has been customary to omit the rear diagonal fork usually extending from the seat post to the rear wheel center, and Figure 1 therefore omits such fork. Instead, the frame receives the cushioning unit for the purpose of resisting the tendency of the frame to collapse for the lack of a rear support or prop.

As the frame, when lacking a rear support, imposes an unusual strain on the horizontal fork 14, it is one function of the novel cushioning means to provide a pivot between the frame and said fork by forming the frontal sections 15 of the fork into circular loops adapted to encircle the end portions of the hub 13; and in order that the pivotal motion may be as free as possible, I provide ball bearings 16 between the loops of the hub periphery, securing the bearings by end nuts 17 screwed upon the hub. In order that the loops 15 may not creep or travel toward the frame post 12 and mar the same, I provide a spacing plate 18 between the bottom portion of the loops, making recesses 15a in the latter to receive tongues 18a extended from the ends of the plate 18. The latter thus serves as a spacer for the loops, and by suitable fastening means such as the screws 18b. However, obviously, the plate 18, tongues 18a and fastening means 18b may assume any other suitable forms as will accomplish the spacing purpose.

In addition to the spacer just described, the fork 14 receives between its sections a more massive spacer in the form of a block 19 which is secured by bolts 20 directed from the exterior of the fork sections.

The cushioning element comprises a coil spring 21 which is adapted to be compressed or distended. As seen in Figure 2, this spring occupies an approximately horizontal position within the angle of the frame posts 11 and 12, one end of the spring being wound around a headed lug 22 projecting inwardly from the post 11, while the other end is wrapped around a projection 23 and anchored by means of a cross-pin 23a passed through the same. The lug 23 is carried by an arm 24 which is laterally bowed at 24a to clear the frame post 12 and is enlarged at 24b to assume the form of the block 19 and be an integral part thereof. In the mounting of the spring 21, it will be understood that its forward end is first wound about the neck of the lug 22 so as to become locked between the frame post and the head of the lug. Then, the opposite end of the spring is mounted directly over the projection 23 and locked from endwise motion by the pin 23a.

It is evident from the above construction that the tendency of the frame to sink from the weight of the rider or the effect of road bumps encountered during travel will be counteracted by the spring 21, since the same prevents the pivotal breaking of the frame in relation to the fork 14. Conversely, strains in the opposite direction such as induced by holes or depressions in the road, are resisted by the distention of the spring 21. In order that the spring may not detract from the appearance of the bicycle or interfere with the garments of the rider, I cover the same with a neat case 25 of arched cross section, welding or otherwise securing the ends of the case to the frame posts 11 and 12.

While the provision of a spring for the purpose specified is not basically novel, it is significant that the present construction differs markedly from other spring mechanisms. First, the spring is seated in the angle or V of the frame bars, which position affords both compactness and a central resistance for the frame, cushioning shocks from both wheels. Second, the approximately horizontal position of the spring affords a direct line of force between the fork arm 24 and the frame lug 22, so that the cushioning action is as nearly direct as the assembly of the parts permits. Third, the spring is applied without any additional frame element or radical change in the frame construction, the necessary connection being the extension 24 of the fork block 19 which is a separate and easily manufactured part. Fourth, a simple and direct connective lever is provided between the fork 14 and the spring by the agency of the arm 24 without the use of extra parts for clearance about the post 12. Fifth, the case 25 not only acts as a shield, but as a retainer against the departure of the spring in case of breakage. Thus, in such event, the amount of play in either direction will be limited, and it will be impossible for the frame to sink and cause the pedals to strike the ground. Finally, the provision of the ball bearing connection of the fork 14 with the frame hub eases the pivotal motion in the region of the latter, permitting the road shocks to be transmitted directly to the spring.

In conclusion it will be seen that I have provided a cushioning means which can be readily and inexpensively adapted to current bicycle frame design, and that it forms a strong, compact and inconspicuous device for the purpose specified.

I claim:

1. In a bicycle, the combination of the main V-frame, a rear-wheel fork making a pivotal connection with the apex of the frame, an arm carried by a portion of said fork, said arm being extended forwardly to the space in the angle of the frame, a spring between the arm and the forward post of said frame, said spring being of the coil type, a headed lug extending inwardly from said forward post and retentively receiving the forward end of the spring by the threading of the latter over the lug, a forwardly extending lug carried by the arm and receiving the rear end of the spring, and a cross-pin intersecting the spring and the arm lug to removably affix the spring to the latter.

2. In a bicycle, the combination of the main V-frame, a rear-wheel fork making a pivotal connection with the apex of the frame, an arm carried by a portion of said fork, said arm being extended forwardly to the space in the angle of the frame, and a spring between the arm and the forward post of said frame, said arm rising from a medial point in the fork, offset laterally to clear the rear frame post, and terminating directly in the medial plane in front of said rear post and the free end of said arm being positioned to engage the rear post of said frame and positively limit the recoil of said spring.

3. The structure of claim 2, and a block removably secured between the legs of said fork and forming a base for said arm, the latter rising from a medial point of said block.

4. The structure of claim 2, and a hood for said spring, such hood being of arched cross-section and a side of said hood cooperating with the rear post of said frame to limit the movement of said arm in lateral directions.

5. The structure of claim 2, and a hood for said spring, such hood being of arched cross-section and extending from the rear post to the front post of the frame and a side of said hood cooperating with the rear post of said frame to limit the movement of said arm in lateral directions.

6. The structure of claim 2, and a hood for said spring, such hood being of arched cross-section and extending from the rear post to the front post of the frame, being rigidly secured to the posts and a side of said hood cooperating with the rear post of said frame to limit the movement of said arm in lateral directions.

7. The structure of claim 2, and a hood for said spring, such hood being recessed in its ends to straddle the inner portions of the frame posts and with its terminal edges welded to the latter and a side of said hood cooperating with the rear post of said frame to limit the movement of said arm in lateral directions.

8. The structure of claim 2, the lower portion of said arm being enlarged to form a spacing block, means removably securing said block between the legs of said fork, and a portion of said arm adjacent said block being formed to engage the rear post of said frame to positively limit the compression of said spring.

9. In a bicycle, the combination of a main V-frame, a substantially horizontal rear wheel fork comprising a pair of spaced leg members pivotally attached at one end to the apex of said frame, a spacing member removably positioned between the legs of said fork, a compressive and expansive spring carried in the angle of said frame and substantially parallel thereto, spring actuating means formed on said spacing member, and means integral with said actuating means and engageable with a post of said frame for positively limiting the expansion and contraction of said spring.

DON W. BRYANT.